(12) United States Patent
Barendse et al.

(10) Patent No.: US 8,147,895 B2
(45) Date of Patent: *Apr. 3, 2012

(54) PROCESS FOR THE PREPARATION OF A SPREADABLE DISPERSION

(75) Inventors: Sandra Petronella Barendse, Vlaardingen (NL); Eckhard Flöter, Vlaardingen (NL); Wim Theodorus Hogervorst, Vlaardingen (NL); Dirk Simon Hendriks Van Horsen, Vlaardingen (NL); Hindrik Huizinga, Vlaardingen (NL); Gijsbert Michiel Peter van Kempen, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 895 days.

This patent is subject to a terminal disclaimer.

(21) Appl. No.: 11/884,282

(22) PCT Filed: Jan. 25, 2006

(86) PCT No.: PCT/EP2006/000800
§ 371 (c)(1),
(2), (4) Date: Jul. 14, 2008

(87) PCT Pub. No.: WO2006/087091
PCT Pub. Date: Aug. 24, 2006

(65) Prior Publication Data
US 2009/0110801 A1    Apr. 30, 2009

(30) Foreign Application Priority Data

Feb. 17, 2005 (EP) .................................. 05075384
Feb. 17, 2005 (EP) .................................. 05075391
Feb. 17, 2005 (EP) .................................. 05075392
Feb. 17, 2005 (EP) .................................. 05075393

(51) Int. Cl.
*A23D 7/02* (2006.01)

(52) U.S. Cl. ......... 426/602; 426/285; 426/606; 426/607

(58) Field of Classification Search ................... 426/602
See application file for complete search history.

(56) References Cited

U.S. PATENT DOCUMENTS

| | | | |
|---|---|---|---|
| 2,521,219 A | 9/1950 | Holman et al. |
| 2,615,160 A | 10/1952 | Baur |
| 2,815,286 A | 12/1957 | Andre |
| 3,170,799 A | 2/1965 | Feuge et al. |
| 3,270,040 A | 8/1966 | Bradshaw et al. |
| 3,338,720 A | 8/1967 | Pichel |
| 3,425,843 A | 2/1969 | Japikse |
| 3,528,823 A | 9/1970 | Rossen |
| 3,881,005 A | 4/1975 | Thakkar et al. |
| 4,226,894 A | 10/1980 | Gawrilow |
| 4,234,606 A | 11/1980 | Gawrilow |
| 4,375,483 A | 3/1983 | Shuford et al. |
| 4,385,076 A | 5/1983 | Crosby |
| 4,391,838 A | 7/1983 | Pate |
| 4,578,274 A | 3/1986 | Sugisawa et al. |
| 4,591,507 A | 5/1986 | Bodor et al. |
| 4,855,157 A | 8/1989 | Tashiro et al. |
| 4,889,740 A | 12/1989 | Price |
| 5,429,836 A | 7/1995 | Fuisz et al. |
| 5,447,735 A | 9/1995 | Miller |
| 5,516,543 A | 5/1996 | Amankonah et al. |
| 5,916,608 A | 6/1999 | Lanting et al. |
| 6,020,003 A | 2/2000 | Stroh et al. |
| 6,031,118 A * | 2/2000 | van Amerongen et al. ... 552/544 |
| 6,056,791 A | 5/2000 | Weidner et al. |
| 6,117,478 A | 9/2000 | Dubberke |
| 6,129,944 A | 10/2000 | Tiainen et al. |
| 6,190,680 B1 | 2/2001 | Yoshino et al. |
| 6,217,920 B1 | 4/2001 | Van Eendenburg et al. |
| 6,248,389 B1 | 6/2001 | Biller et al. |
| 6,316,030 B1 | 11/2001 | Kropf et al. |
| 6,352,737 B1 | 3/2002 | Dolhaine et al. |
| 6,395,324 B1 | 5/2002 | Effey et al. |
| 6,468,578 B1 | 10/2002 | Mayer et al. |
| 7,601,184 B2 | 10/2009 | Tischendorf |
| 2002/0034577 A1 | 3/2002 | Vogensen |
| 2002/0048606 A1 | 4/2002 | Zawistowski |
| 2002/0076476 A1 | 6/2002 | Kuil et al. |
| 2002/0168450 A1 | 11/2002 | Drudis et al. |
| 2006/0051479 A1 | 3/2006 | Chiavazza et al. |
| 2006/0280855 A1 | 12/2006 | Van den Berg et al. |

FOREIGN PATENT DOCUMENTS

| | | |
|---|---|---|
| DE | 10253111 | 5/2004 |
| EP | 0021483 | 2/1984 |
| EP | 0393963 | 10/1990 |
| EP | 0572051 | 5/1997 |
| EP | 0775444 | 5/1997 |
| EP | 0744992 | 10/1997 |
| EP | 0897671 | 2/1999 |
| EP | 1114674 | 7/2001 |
| EP | 1197153 | 4/2002 |
| EP | 1236589 | 9/2002 |
| EP | 1285584 | 2/2003 |
| EP | 1419698 | 5/2004 |
| GB | 2095968 | 10/1982 |
| GB | 1114674 | * 11/2001 |
| WO | WO 93/08699 | 5/1993 |
| WO | WO 95/21688 | 8/1995 |
| WO | WO 98/47386 | 10/1998 |

(Continued)

OTHER PUBLICATIONS

Co-pending application U.S. Publication No. 2006/0280855A1 dated Feb. 14, 2006.

(Continued)

*Primary Examiner* — Carolyn Paden
(74) *Attorney, Agent, or Firm* — Gerard J. McGowan, Jr.

(57) ABSTRACT

Process for the preparation of a spreadable edible dispersion wherein a mixture of oil and solid structuring agent particles is subjected to stirring and an aqueous phase and/or solid phase is gradually added to the mixture until a dispersion of the desired oil content is obtained, wherein the solid structuring agent particles have a microporous structure of submicron size particles.

5 Claims, 1 Drawing Sheet

FOREIGN PATENT DOCUMENTS

| WO | WO 01/00046 | 1/2001 |
|---|---|---|
| WO | WO 02/100183 | 12/2002 |
| WO | WO 03/103633 | 12/2003 |
| WO | WO 2005/014158 | 2/2005 |

OTHER PUBLICATIONS

International Search Report International Application No. PCT/EP2006/000800 for WO 2006/087091 dated Aug. 24, 2006.

European Search Report Application No. 05075393.8 dated Aug. 2, 2005.

Ullmann's Encyclopedia of Industrial Chemistry, Fifth Ed., vol. A16: "Magnetic Materials to Mutagenic Agents", 1990, pp. 156-158.

Van den Enden et al., "Rapid Determination of Water Droplet Size Distributions by PFG-NMR", Journal of Colloid and Interface Science, vol. 140, No. 1, Nov. 1990, pp. 105-113.

Gunstone et al., The Lipid Handbook, Second Ed., 1994, p. 321.

Gerber et al., "Effect of Process-Parameters on Particles Obtained By the Rapid Expansion of Supercritical Solutions", Proceedings on World Congress on Particle Technology, Jul. 1998, pp. 1-11, XP001080632.

Co-pending application PCT/EP2009/066098 filed Dec. 1, 2009.

Co-pending application PCT/EP2009/066093 filed Dec. 1, 2009.

Co-pending application Janssen et al., U.S. Appl. No. 11/884,292, filed Apr. 23, 2006.

Co-pending application Garbolino et al., U.S. Appl. No. 11/884,289, filed Aug. 14, 2007.

Co-pending application Janssen et al., U.S. Appl. No. 12/086,096, filed Jun. 5, 2008.

Office Action dated Jan. 25, 2011 for Janssen, U.S. Appl. No. 11/884,292, filed Apr. 23, 2008.

Co-pending application Van den Berg et al., U.S. Appl. No. 10/664,944, filed Jun. 20, 2006.

Office Action dated Feb. 18, 2011 for Garbolino, U.S. Appl. No. 11/884,293, filed Aug. 14, 2007.

PCT International Preliminary Report on Patentability dated Jan. 3, 2006.

Turk et al., "Micronization of pharmaceutical substances by the Rapid Expansion of Supercritical Solutions (RESS); a promising method to improve bioavailability of poorly soluble pharmaceutical agents", The Journal of Supercritical Fluids, vol. 22, No. 1 (Jan. 2002), pp. 75-84, XP004313515.

Anonymous, "Particle sizes of milk powders", Dairy Ingredients Fax, vol. 2, No. 4, 8, 4//00, tables, XP002264853.

Kochar, S.P., "Influence of Processing on Sterols of Edible Vegetable Oils", Prog. Lipid Research, 1983, vol. 22, pp. 161-188.

* cited by examiner

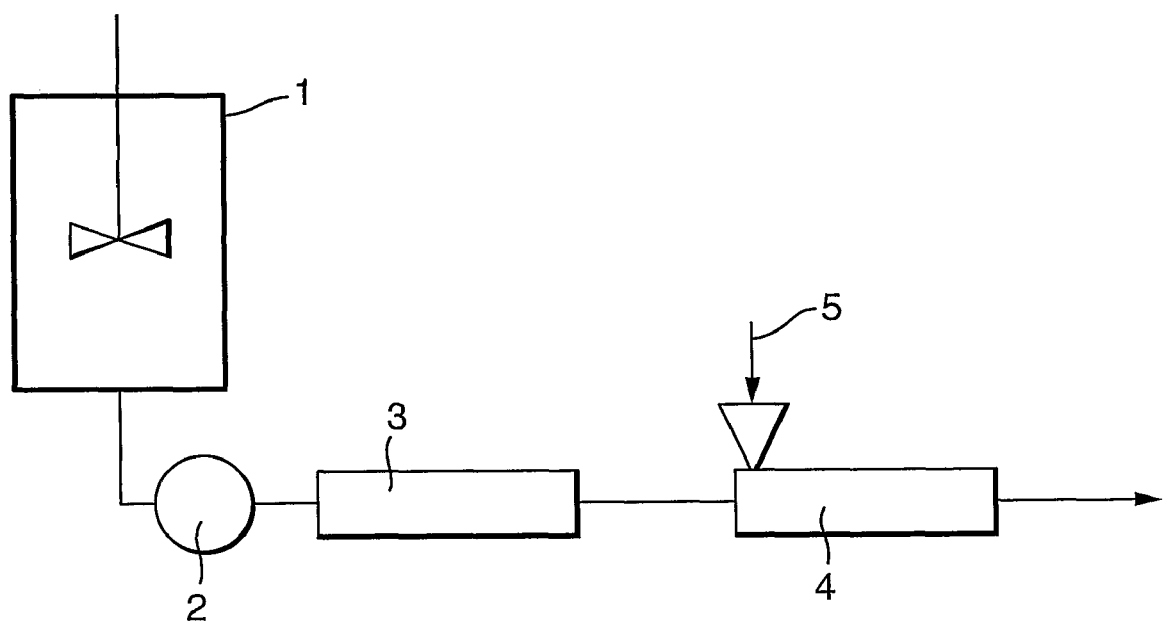

PROCESS FOR THE PREPARATION OF A SPREADABLE DISPERSION

FIELD OF THE INVENTION

The present invention relates to a process for the preparation of a spreadable edible dispersion comprising oil and structuring agent, in particular to such dispersions comprising oil and structuring agent as continuous phase and a dispersed phase. The dispersed phase may be an aqueous liquid (thus forming a water-in-oil emulsion) and/or a solid particulate matter (thus forming a suspension).

BACKGROUND OF THE INVENTION

Edible dispersions comprising oil and structuring agent are well known. Examples of well-known products that substantially consist of such edible dispersions are water-in-oil emulsions, such as for instance margarines and spreads. These edible dispersions typically have an oil phase that is a blend of liquid oil and fat that is solid at normal ambient temperature (20° C.). This solid fat, often also designated as hardstock, acts as structuring agent, and its function is to stabilise the dispersion. For a margarine or spread, ideally the structuring agent has such properties that it should have melted or dissolved at mouth temperature, otherwise the product has a heavy, waxy mouthfeel.

Other known dispersions comprising oil and structuring agent are disclosed in EP-A-775444 and WO 98/47386. Herein the dispersed phase is a dry particulate matter, such as e.g. flour, starch, salt, spices, herbs etc. Generally, the edible dispersions comprising structuring agent are prepared according to prior art processes that encompass the following steps:
1) mixing/dispersion of the aqueous phase and/or the solid phase and the oil phase, at a temperature where the oil phase, including the structuring agent is liquid;
2) formation of a fat crystal network to stabilise the resulting dispersion and give the product some degree of firmness;
3) modification of the crystal network to produce the desired firmness and confer plasticity.

In case the dispersion is a low-fat water-in-oil emulsion spread (i.e. with a oil content of 45 wt % or less), normally in step 1) a oil-in-water emulsion (premix) is formed, which in step 2) is inverted, so that a transition of the emulsion from oil-in-water to water-in oil (inversion) occurs. Inversion has a number of disadvantages: it is difficult to control and rework (i.e. material that is not packed, but returned to the premix, needs to be reinverted, which may lead to processing complications.

The steps 1)-3) are usually conducted in a process that involves apparatus that allow heating, cooling and mechanical working of the ingredients, such as the churn process or the votator process. The churn process and the votator process are described in Ullmanns Encyclopedia, Fifth Edition, Volume A 16 pages 156-158. Using these techniques excellent dispersions (spreads) having high emulsion stability and good melting properties in the mouth can be prepared.

However, a disadvantage of the known processes is that the process involves a heating step and a cooling step and therefore requires a lot of energy. In a dispersion with for instance 4 wt. % structuring agent the whole weight of the dispersion (100 wt. %) needs to be heated and cooled.

Another disadvantage of the known processes is that the choice of fats that can practically be used as structuring agent is rather limited. If the melting point of the structuring agent is too high the melting properties in the mouth are unsatisfactory. If on the other hand, the melting point is too low, the emulsion stability will be negatively affected. Moreover the amount of saturated fatty acids in the structuring agent is usually relatively high. Saturated fatty acids are a known risk factor for cardiovascular health.

Further disadvantage of the known processes is that the product may deteriorate due to the changes in temperature caused by the heating and cooling step and that heat-sensitive ingredients cannot be incorporated.

Additionally, when low-fat spreads are prepared an inversion step is usually needed, which is difficult to control and has rework problems.

Co-pending application PCT/EP2004/006544 describes edible dispersions, including water-in-oil emulsions, that comprise a structuring agent having a microporous structure of submicron size particles. The water-in-oil emulsion may be a table spread. In the examples pourable emulsions and pourable dispersions were described. The edible dispersions may for instance be prepared by mixing an oil phase with structuring agent particles with a separately prepared water phase.

SUMMARY OF THE INVENTION

It is therefore an object of the invention to provide a process for the preparation of a spreadable dispersion that requires less energy than the known processes. Another object is to provide such a process that allows the use of more types of structuring agent, especially more sorts of hardstock. A further object of the invention is a reduction of the amount of saturated fatty acids in the hardstock. Still a further object of the invention is to provide a process for the preparation of a dispersion that allows the incorporation of heat-sensitive ingredients and/or that avoids deterioration of the emulsion.

One or more of these objects is attained according to the invention which provides a process for the preparation of a spreadable edible dispersion wherein a mixture of oil and solid structuring agent particles is subjected to stirring and an aqueous phase is gradually added to the mixture until a dispersion is obtained, wherein the solid structuring agent particles, also described as secondary particles have a microporous structure, and said particles are agglomerates of primary particles of submicron size, said primary particles are platelets having an average thickness of 0.01-0.5 µm.

Gradually is herein defined as not adding the whole solid or aqueous phase at the start of the process, but in two or more portions at different times during the process if conducted batchwise or in two or more places in the process equipement in a continuous process.

With the process according to the invention, products are obtained that have a smaller water droplet size (D3,3 as described herein) and a firmer structure (Stevens value as described herein measured at room temperature) than products prepared according to the prior art votator process. The smaller water droplet size leads to increased microbiological stability, so products may be made that need less or no salt and/or preservative.

Further according to the invention low fat spreads may be prepared that need no thickenener or gelling agent in the water phase. When low-fat spreads are prepared an additional advantage of the process according to the invention is that no inversion is needed.

Contrary to the process described in Co-pending application PCT/EP2004/006544, in the present process the aqueous phase and/or solid phase is gradually added to the mixture until a dispersion of the desired oil content is obtained. This makes the preparation of dispersion having a relatively low oil content, i.e. below 45 wt. %, possible.

DETAILED DESCRIPTION OF THE INVENTION

According to the invention, an aqueous phase is gradually added to a mixture of oil and solid structuring agent particles which is stirred, until a dispersion is obtained.

A dispersion is herein defined as a system in which two or more phases that are insoluble or only slightly soluble are distributed in one another.

The dispersion may be an emulsion, a suspension or foam or any combination thereof, it may be oil continuous, water continuous or bi-continuous. Preferably the dispersion is oil continuous, more preferably an oil continuous emulsion or oil continuous suspension.

Where a solid phase is present in the dispersion according to the invention, it is preferably a solid phase of dry particulate matter.

Where an aqueous phase is present in the dispersion according to the invention, it is preferably a dispersed aqueous phase.

The amounts given will be expressed in wt. % relative to the total weight of the food composition, unless indicated otherwise.

Fat and oil may sometimes be used interchangably herein, for instance fat phase and oil phase and fat content or oil content may be used to indicate the same.

According to the invention spreadable edible dispersions are provided comprising micronised structuring agent particles wherein said structuring agent particles, also described as secondary particles have a microporous structure, and said particles are agglomerates of primary particles of submicron size, said primary particles are platelets having an average thickness of 0.01-0.5 µm, wherein the dispersion has a Stevens value, as defined herein and measured at room temperature, of 30 g or more, preferably 50 g or more, more preferably 80 g or more and most preferably 100 g or more.

Preferably the dispersion is a low-fat water-in-oil emulsion spread having a fat content of 45 wt. % or less.

The invention further provides a low-fat water-in-oil emulsion spread having a fat content of 45 wt. % or less, a Stevens value as defined herein as defined herein and measured at room temperature, of 60 g or more and a saturated fat content (SAFA) of 25 wt. % or less. SAFA content (wt. %) is herein expressed based on the weight of the fat phase.

Preferably the spreadable edible dispersions according to the invention have a low water droplet size, preferably the water droplet size as defined herein is 10 µm or less, more preferably 5 µm or less.

According to the invention, the dispersion is formed by mixing oil, the solid structuring agent particles and the other phase or phases of the dispersion, such as for example an aqueous phase, a solid phase and/or a gas phase.

According to the invention, the solid structuring agent particles (also described herein as secondary particles) should have a microporous structure of submicron size particles (also described herein as primary particles).

The secondary particles are agglomerates of primary particles which have a microporous strcuture. The size of the primary particles is submicron (that is have a diameter below 1µ).

An example of a microporous structure is shown in FIGS. 6 and 7 of PCT/EP2004/006544. The primary particles typically have the shape as shown in FIG. 7, in which the platelets with submicron dimensions are the primary particles. The thickness of the platelets should be submicron, preferably the thickness is on average 0.01-0.5 µm, more preferably 0.03-0.2 µm, even more preferably 0.06-0.12 µm.

Equivalent good results were obtained for a secondary particles having a microporous structure of more bubble-like shape, such as shown in FIG. 10 of PCT/EP2004/006544. In such microporous structure the wall thickness of the bubbles should be submicron, for instance on average 0.01-0.5 µm, more preferably 0.03-0.2 µm, even more preferably 0.06-0.12 µm.

The secondary particles, may, in the course of the preparation of the dispersion, for instance through the force of a mixer, be broken into submicron particles. The resulting submicron particles will form the structuring network of the dispersion.

Preferably, the structuring agent is edible lipid, more preferably it is edible fat. Edible fats consist predominantly of triglycerides. Typically such edible fats suitable as structuring agent are mixtures of triglycerides, some of which have a melting point higher than room or ambient temperature and therefore contain solids in the form of crystals.

The solid structuring agent, also denoted as hardstock, serves to structure the fat phase and helps to stabilise the dispersion.

For imparting to common margarine a semi-solid, plastic, spreadable consistency this stabilising and structuring functionality plays an important role. The crystals of the solid fat form a network throughout the liquid oil resulting into a structured fat phase. The aqueous phase droplets are fixed within the spaces of the lattice of solid fat crystals. In this way coalescence of the droplets and separation of the heavier aqueous phase from the fat phase is prevented.

The process according to the invention may be executed batch-wise or continuous. Conventional unit operations and apparatus, e.g. mixers, pumps and extruders may be used. A suitable process flow diagram for a continuous process according to the invention is given in FIG. 1. Micronised fat may be added to the premix or via the inlet (5), preferably at least part of the micronised fat is added via inlet (5).

Further common ingredients of the fat phase are emulsifiers, such as monoglycerides and lecithin, colouring agents and flavours.

The solid structuring agent particles (secondary particles) preferably have an average particle size ($D_{3,2}$) of 60 micrometer or less, more preferably the solid structuring agent particles have an average particle size of 30 micrometer or less. The average particle size ($D_{3,2}$) is determined as indicated in the examples.

Preferably the solid structuring agent particles are prepared using a micronisation process. In the micronisation process the solid structuring agent particles are prepared by preparing a homogeneous mixture of structuring agent and liquified gas or supercritical gas at a pressure of 5-40 MPa and expanding the mixture through an orifice, under such conditions that a spray jet is applied in which the structuring agent is solidified and micronised. The liquified gas or supercritical gas may be any gas that may be used in the preparation of food products, for example carbondioxide, nitrogen, propane, ethane, xenon or other noble gases. Carbondioxide and propane are preferred. Carbondioxide is most preferred. Advantages of carbondioxide are that it has a mild (31° C.) critical temperature, it is non-flammable, nontoxic, environmentally friendly and it may be obtained from existing industrial processes without further contribution to the greenhouse effect. It is fairly miscible with oil and is readily recovered owing to its high volatility at ambient conditions. Finally liquid $CO_2$ is the second least expensive solvent after water.

The temperature of the mixture of structuring agent and liquified gas or supercritical gas is preferably such that the mixture forms a homogeneous mixture. Advantageously, the temperature of the mixture of structuring agent and liquified gas or supercritical gas is below the slip melting point of the structuring agent at atmospheric pressure and above the temperature at which phase separation of the mixture occurs. Under such conditions the smallest micronised particles may be obtained.

The pressure and temperature of the mixture of structuring agent and liquified or supercritical gas is preferably such that a large amount of the gas may be dissolved in the structuring agent. The amount dissolved will be determined by the phase diagram of the mixture of structuring agent and liquified or supercritical gas. At higher pressures as well as at lower temperatures more gas will dissolve in the structuring agent.

Preferably the temperature and pressure are chosen such that 10 wt. % or more, more preferably 20 wt. % or more or most preferably 30 wt. % or more of gas is dissolved in the liquid phase. The mixture of structuring agent and liquified or supercritical gas may contain additional substances, such as for instance oil. We have found that the addition of oil may reduce sintering of the micronised particles of the structuring agent.

The mixture containing structuring agent and liquified or supercritical gas is depressurised over a small orifice or nozzle, to break up the mixture into small droplets. The break-up of the mixture into droplets can be assisted e.g. by internals inside the nozzle before the orifice to generate a whirl, or by passing a gas at a high flow rate near the orifice.

The mixture is depressurised into a volume where the pressure is higher than, equal to or lower than atmospheric pressure.

We have found that sintering, agglomeration and ripening of micronised particles of the structuring agent will lead to a reduced performance of the particles for structuring the dispersion.

To avoid sintering, agglomeration and/or ripening of the micronised particles, preferably a gas jet is applied in addition to the flow of the spray jet. The additional gas jet is most effective when the gas jet is positioned such that recirculation of material expanded through the orifice is reduced or avoided. Especially advantageous is a position wherein the gas from the gas jet flows essentially tangentially to the flow direction of the spray jet. Most advantageously the gas inlet for the gas jet is positioned behind the exit of the nozzle, see FIG. 2 of co-pending application PCT/EP2004/006544. This figure shows that the additional gas inlet (1) behind the exit of the nozzle (2) creates a gas flow (3) tangentially to the flow of the spray jet (4).

A further preferred edible dispersion according to the invention is a dispersion of a solid matter, preferably a dry particulate matter, dispersed in a continuous phase of oil and structuring agent. Preferred material for the dry particulate matter is one or more of flour, starch, salt, herbs (e.g. dried herbs), spices and mixtures thereof. Preferably in such dispersions, the amount of solid matter is 30-75 wt. %, more preferably 40-65 wt. % based on total weight of the dispersion.

The amount of structuring agent should be such that a suitably stable dispersion is obtained. When the structuring agent is micronised fat, the amount is preferably 1-20 wt. %, more preferably 4-12 wt. % based on total weight of the dispersion.

DESCRIPTION OF THE FIGURES

FIG. 1 Process flow diagramme for a continuous process. (1) designates a premix vessel, (2) a pump, (3) a high shear mixer, (4) an extruder type mixer and (5) a feed entrance for micronised fat.

EXAMPLES

General
Method to Determine Slip Melting Point

The slip melting point of structuring agent is determined in accordance with F. Gunstone et al, The Lipid Handbook, second edition, Chapman and Hall, 1995, page 321, Point 6.2.3, Slip point.

Method to Determine $D_{3,2}$ of the Particle Size Distribution of Micronised Fat Particles Low-angle laser light scattering (LALLS, Helos Sympatic) was used to measure the average particle size ($D_{3,2}$). The fat particles were suspended in water in a quixel flow cuvette with an obscuration factor of 10-20%. The diffraction pattern was measured at 632.8 nm with a lens focus of 100 mm and a measurement range of 0.5-175 µm. Calculations were bases on the Fraunhofer theory.

A full description of the principle of LALLS is given in ISO 13320-1.

Method to Determine $D_{3,3}$ of Water Droplet Size Distribution in an Emulsion

The water droplet size was measured using a well-known low resolution NMR measurement method. Reference is made to Van den Enden, J. C., Waddington, D., Van Aalst, H., Van Kralingen, C. G., and Packer, K. J., Journal of Colloid and Interface Science 140 (1990) p. 105.

Method to Determine Oil Exudation

Oil exudation is determined by measuring the height of the free oil layer that appears on top of the product. This free oil layer is considered a product defect. In order to measure oil exudation, the product is filled into a scaled glass cylinder of 50 ml. The filling height is 185 mm. The filled cylinder is stored in a cabinet at constant temperature (15° C.). Height measurements are executed every week, by measuring the height of the exuded oil layer in mm with a ruler. Oil exudation is expressed as the height of the exuded oil layer divided by the original filling height and expressed in %. Shaking of the cylinders should be avoided.

Stevens Value

Stevens values give an indication about the firmness of a product. The firmness of all products stored at 5° C. for 24 hours was measured at room temperature using a Stevens Texture Analyser (1 mm/sec, 25 mm depth, 4.4. mm probe) and is quoted herein as the Stevens value (in g).

Example 1

Preparation of a Spreadable Margarine

A high-fat spreadable margarine was prepared with the composition shown in table 1:

TABLE 1

| Composition of high-fat spreadable margarine | |
|---|---|
| Ingredient | Amount (wt. %) |
| Oil phase | |
| Sunflower oil | 59.68 |
| Micronised fat powder[1] | 9.64 |
| Lecithin Bolec ZT[1] | 0.32 |

TABLE 1-continued

Composition of high-fat spreadable margarine

| Ingredient | Amount (wt. %) |
|---|---|
| Emulsifier Hymono 8903 | 0.20 |
| beta-carotene (0.4 wt. % solution in sunflower oil) | 0.15 |
| Water phase | |
| Water | 29.65 |
| Potassium sorbate | 0.08 |
| Sodium chloride | 0.28 |

[1]Hardstock fat as prepared in example 1 and 2 of EP-A-89082 which was micronised as in example 1 of PCT/EP2004/006544.

The water phase was prepared by adding salt and potassium sorbate to distilled water and adjusting the pH of distilled water from 7.7 to 4.0 using 5 wt. % solution of citric acid in water,-and heated for 5 minutes in a bath of 60° C. to dissolve the solids. The oil phase was prepared by dissolving the emulsifier ingredients and β-carotene in the total amount of sunflower oil at 60° C. and cooled down to 15° C. afterwards. Subsequently the micronised fat powder was added to the oil phase carefully using a spatula and the oil phase was mixed with a kitchen mixer (Philips Essence HR1357/05) for 2 minutes. Then the water phase was added to the oil phase and the resulting mixture was mixed with the mixer for another 5 minutes at ambient temperature. A droplet size (D3,3) of about 10 μm was obtained. The spread was put in a margarine tub and stored at 5° C. Results in table 3.

Example 2

Preparation of a Low-Fat Spread

A low-fat (33 wt. % fat) spreadable margarine spread was prepared with the composition shown in table 2:

TABLE 2

Composition of low-fat spread

| Ingredient | Amount (wt. %) |
|---|---|
| Oil phase | |
| Sunflower oil | 27.65 |
| Micronised fat powder as in example 1 | 4.59 |
| Lecithin Bolec ZT[1] | 0.32 |
| Emulsifier Hymono 8903 (monoglyceride) | 0.33 |
| Beta-carotene (0.4 wt. % solution in sunflower oil) | 0.15 |
| Water phase | |
| Water | 66.60 |
| Potassium sorbate | 0.08 |
| Sodium chloride | 0.28 |

The micronised fat powder was mixed with half of the oil to obtain a fat powder/oil slurry. The fat/oil slurry was then stirred manually in the remainder of the oil to make the oil phase. In the next step the oil phase (slurry) was put in an EscoLabor device and half of the water phase was added to the oil phase. The EscoLabor vessel was kept at 5° C. The water and oil phase were mixed under vacuum.

The scraper speed was found to be 80% of the maximum rotational speed and power of the Ultra Turrax was found to be optimal at 50% of maximum power. During the mixing of the oil- and water phases the remaining amount of water was added cautiously within 5 minutes. This yielded a homogeneous but very thick fat continuous product after 15 minutes. After 15 a droplet size (D3,3) of 3 μm was obtained. This low fat spread was evaluated after 4 weeks of storage at 5° C. Results are given in table 3.

TABLE 3

Stevens values and fat level low-fat micronised fat spread

| Example | Fat level (%) | Stevens value at 5° C. (g) |
|---|---|---|
| Example 1 | 70 | 88 |
| Example 2 | 33 | 112 |

Example 3

A spread was produced with a composition as in table 4. A stable spread resulted. The water phase was made by mixing the salt in distilled water and holding the mixture at room temperature. The fat phase was produced by adding the micronised fat powder to liquid oil using a spatula. The water phase and the oil phase were mixed using a home kitchen mixer.

It was possible to prepare a stable spread without emulsifier and thickener. The long term stability and/or consistency of the spread without emulsifier may be improved by adding a thickener to the water phase, e.g. 1 wt. % starch, a suitable starch type is Resistamyl 310.

TABLE 4 composition of example 3

| | | |
|---|---|---|
| Oil Phase | | 39.85 |
| | Sunflower oil | 33.87 |
| | Micronised fat powder as in example 1 | 5.98 |
| | Beta-carotene (0.4 wt. % solution in Sunflower oil) | 0.15 |
| Water phase | | |
| | Water | 59.5 |
| | Salt | 0.5 |
| | | 100 |

The invention claimed is:

1. Process for the preparation of a spreadable edible dispersion comprising subjecting a mixture of oil and solid structuring agent particles to stirring and gradually added an aqueous phase to the mixture until a dispersion is obtained, wherein the solid structuring agent particles, also described as secondary particles, have a microporous structure, and said particles are agglomerates of primary particles of submicron size, said primary particles are platelets having an average thickness of 0.01-0.5 microns.

2. Process according to claim 1, wherein the solid structuring agent particles are edible lipid.

3. Process according to claim 2, wherein the lipid is a fat.

4. Process according to claim 1 wherein the solid structuring agent particles were prepared using a micronisation process wherein the solid structuring agent particles were prepared by preparing a homogeneous mixture of structuring agent and liquified gas or supercritical gas at a pressure of 5-40 MPa and expanding the mixture through an orifice, under such conditions that a spray jet was applied in which the structuring agent was solidified and micronised.

5. Spreadable edible dispersion obtainable by a process according to claim 1.

* * * * *